United States Patent Office 3,181,998
Patented May 4, 1965

3,181,998
TABLET DISINTEGRATION
Joseph L. Kanig, 889 Baldwin Drive, Westbury, N.Y.
No Drawing. Filed Aug. 12, 1960, Ser. No. 49,140
6 Claims. (Cl. 167—82)

This invention relates to new and useful improvements in the disintegration of tablets and more particularly seeks to provide tablets containing dormant enzymes that become activated when needed to induce disintegration of the tablets by attacking a non-medicament component, generally the binder.

Tablets are one of the primary methods of introducing medicaments into the body because of convenience, simple control of dosage, ease of self-medication, etc.

Tablets are generally formed in dies to which pressure is applied by presses to form the desired shape and density. Some materials can be compressed into tablets without further treatment, other materials are first pre-compressed (slugging) to form granules, screened and then subsequently pressed into tablet form but most materials are mixed with a binder (or granulating agent), wetted, dried to form granules, screened, lubricated and then pressed into tablets.

The binder forms a bond between the tablet material particles of powder size to form granules and the granules are then pressed into tablets. Thus the granules may be considered as aggregates of small powder particles which are held together by a binder which confers upon the granules the desired properties to permit compression into tablets. Many materials are used today as binders, including starches, gelatin, zein, cellulose derivatives, glucose, sucrose, gums, Irish moss, sodium alginate, water, alcohols, et al., depending, of course, to a certain extent on the tabletting material.

In any of the tabletting methods a disintegrating agent is used to break down the tablet in the body but the need is far greater when binders are present, as the binding effect must be overcome by the disintegrating agent. Thus disintegrating agents are those materials in a tablet which cause rupture or breaking thereof when the tablet becomes wet so as to expose more surface in order to hasten solubility, suspension or dispersion of the tablet components.

In addition to medicaments, binders and disintegrating agents, tablets generally contain lubricants, flavoring agents and diluents or fillers. There are many disintegrating agents but starch is the most widely used, particularly corn or potato starch but tapioca, banana, rice and wheat starches are also used. In some instances starches are not desired and other agents are used, such as alginates, cellulose, carbonates with weak acids, bentonite, citrus pulp, et al. Starch as a disintegrating agent must not be confused with starch as a binder. In the former case, the starch (non-hydrolyzed) is added just before the compression within a dry environment, but as a binder the starch is added as paste (hydrolyzed) or amylopectin and subsequently dried so that a bond is formed.

The mechanism of starch disintegration is not completely understood, it being thought at one time that the starch absorbed water, expanded and thus broke the tablet but it is now suggested that the starch merely serves as focal points for water to be absorbed into the tablet, and that the water exerts sufficient hydrostatic force to break the tablet apart to the original granule size. In any event, the speed of disintegration generally needs to be increased and invariably it would be helpful to disintegrate the granules per se to their original powder particle size which is not done by any disintegrating agents presently.

Therefore, it is an object of this invention to provide agents that will effect tablet disintegration faster than previously known agents.

It is also an object of this invention to provide agents that will effect disintegration of tablet granules to their original powder particle size to permit quicker and more effective utilization of the medicament.

It is a further object of this invention to select particular agents that will react with the specific tablet binder to induce disintegration of the tablet and granules thereof.

I have found that tablets may be disintegrated faster and more completely by incorporating enzymes therein in the dry state which will be activated when the tablet contacts water (or moisture available in the gastro-intestinal tract), the enzyme having been selected so as to react on a non-medicament component of the tablet, this component generally being the binder.

With the above objects and others in view, the nature of which will be more apparent, the invention will be more fully understood by reference to the accompanied detailed description and the appended claims.

Ordinarily in forming tablets by the granulation method all of the components of the tablet are added together and mixed well including a binder and the material is then wetted to form a moist mass, screened in this condition to form granules, then dried, screened again to form smaller more uniform granules, lubricated, then placed into the dies and pressed into tablet shape. Most disintegrating agents are added between the final screening and the pressing step at a time when the tablet components are in the dry state as the disintegrating agent is to be activated by coming into contact with water in the gastrointestinal tract, although some disintegrating agents may be added earlier. Enzymes will be added at this dry stage as they are more sensitive to water and must be kept dry (or otherwise dormant) before the activation begins.

Amylopectin (or hydrolyzed starch) is a common binder now used. An amolytic enzyme added to the components of such a tablet immediately before compressing the granules will produce a tablet that will quickly disintegrate to the original powder particle size once it is placed in water. Such a process requires no change from the present processing or equipment used in manufacturing tablets. Without change in equipment or processing, two distinct advantages have been gained, namely (1) fast disintegration and (2) disintegration to the original powder particle size, not just the granules, which are difficult to utilize themselves relative to the much smaller powder particles.

There are, of course, many variations and combinations that will work in a similar manner, a limited number being as follows:

| Binder | Enzyme |
| --- | --- |
| Cellulose derivatives: | |
|   Sodium carboxymethyl cellulose | Cellulases. |
|   Ethyl cellulose | |
|   Methyl cellulose | |
| Starches | Amylases. |
| Gums: | |
|   Acacia | Hemicellulase (mannan-depolymerase). |
|   Tragacanth | |
|   Karaya | |
|   Locust Bean Gum | |
| Proteins: | |
|   Gelatin | Proteases. |
|   Zein | |
| Pectin: Citrus pulp | Pectinases. |
| Glucose | Glucose digesting enzyme systems. |
| Sucrose | Invertases. |
| Irish Moss | Carragheenases. |
| Sodium Alginate | Do. |

It is not intended to be limited to the binders and enzymes set forth herein as it will be obvious to anyone in the art as to what enzyme or enzymes may be used to react with any given binding agent. In some instances there may be a plurality of enzymes that will work for each particular binder. The amount of enzyme will depend largely on the specific binder-enzyme system and will vary widely, but generally 0.25 to 20% of enzyme, based on the dry tablet weight will be satisfactory. The rate of disintegration is controlled, of course, by the amount of enzyme.

The following formulations are demonstrative only of tablets made in accordance with my invention. The amounts are for 100 tablets and are in grams unless otherwise stated:

| Example | 1 | 2 | 3 | 4 |
|---|---|---|---|---|
| Medicament | Sodium bicarbonate, 300 | Powdered thyroid, 30 | Calcium gluconate, 160 | Acetylsalicylic acid, slugged granules, 350. |
| Fillers | {Sucrose, 100 / Lactose, 50} | Sucrose, 20 / Lactose, 10 | Sucrose, 50 / Lactose, 25 | |
| Binder | 10% w./w. starch paste, 50 | 2% w./v. methyl cellulose, 20 cc. | 5% w./v. locust bean gum, 18 cc. | Gelatin powder, 20. |
| Lubricant | Magnesium stearate, 5 | Magnesium stearate, 0.8 | Magensium stearate, 2.5 | Magnesium stearate, 4. |
| Disintegrating agent | Amylase, 15–25 | Cellulase, 4–8 | Hemicellulase, 1–5 | Protease, 18–35. |

In Examples 1, 2 and 3, the medicaments and fillers were weighed, sifted through a 40 mesh screen and then thoroughly mixed. The powder mass was then moistened by the binder paste or solution and the moistened mass forced through a 6 mesh screen. The wet granules were then dried in an oven and then passed through a 10 mesh screen. The dried granules were weighed and mixed with an appropriate amount of enzyme which was thoroughly distributed, the lubricant added and thoroughly distributed and the material then fed into the compression machine and pressed into tablets. These tablets disintegrated rapidly when placed in water with the medicament returning to its original 40 mesh size.

In Example 4, the medicament, binder and enzyme are thoroughly mixed, the lubricant added and thoroughly mixed and the material then fed into the compression machine and pressed into tablets. These tablets disintegrated immediately when placed in water, the acetylsalicylic acid only returning to its granular size however.

I claim:

1. A compressed oral tablet adapted to be ingested intact without chewing or fracturing and prepared by admixing amylopectin, at least one specific enzyme known to react with said amylopectin upon activation with an aqueous media, and a non-enzymatic therapeutic component, whereby disintegration of said tablet will be accelerated in the presence of said aqueous media.

2. A compressed oral tablet adapted to be ingested intact without chewing or fracturing and prepared by admixing a gum, a hemicellulase known to react with said gum upon activation with an aqueous media, and a non-enzymatic therapeutic component, whereby disintegration of said tablet will be accelerated in the presence of said aqueous media.

3. A compressed oral tablet adapted to be ingested intact without chewing or fracturing and prepared by admixing locust bean gum, a hemicellulase known to react with said locust beam gum upon activation with an aqueous media, and a non-enzymatic therapeutic component, whereby disintegration of said tablet will be accelerated in the presence of said aqueous media.

4. A compressed oral tablet adapted to be ingested intact without chewing or fracturing and prepared by admixing a cellulose derivative, a cellulase known to react with said cellulose derivative upon activation with an aqueous media, and a non-enzymatic therapeutic component, whereby disintegration of said tablet will be accelerated in the presence of said aqueous media.

5. A compressed oral tablet adapted to be ingested intact without chewing or fracturing and prepared by admixing a protein, a protease known to react with said protein upon activation with an aqueous media, and a non-enzymatic therapeutic component, whereby disintegration of said tablet will be accelerated in the presence of said aqueous media.

6. A compressed oral tablet adapted to be ingested intact without chewing or fracturing and prepared by admixing a pectin, a pectinase known to react with said pectin upon activation with an aqueous media, and a non-enzymatic therapeutic component, whereby disintegration of said tablet will be accelerated in the presence of said aqueous media.

References Cited by the Examiner
UNITED STATES PATENTS

| | | | |
|---|---|---|---|
| 671,804 | 4/01 | Metcalf | 167—82 |
| 1,546,820 | 7/25 | Ballard et al. | 167—73 X |
| 2,801,203 | 7/57 | Leb et al. | 167—95 |
| 2,852,433 | 9/58 | Hiatt | 167—82 |
| 2,891,868 | 6/59 | Heggie et al. | 99—135 |
| 2,906,621 | 9/59 | Catron | 99—2 |
| 2,957,804 | 10/60 | Shuyler | 167—46 |
| 3,004,893 | 10/61 | Martin | 167—73 |
| 3,019,167 | 1/62 | Innerfield | 167—73 |
| 3,034,911 | 5/62 | McKee et al. | 106—210 |
| 3,065,142 | 11/62 | Antonides | 167—82 |

FOREIGN PATENTS 669,782  4/52  Great Britain.

OTHER REFERENCES

Chapman et al.: "Physiological Availability of Drugs in Tablets," Canad, Med. Ass'n. J., vol. 76, pp. 102–106, Jan. 15, 1957.

Dragstedt: "Oral Medication with Preparations for Prolonged Action," J.A.M.A., vol. 168, No. 12, pp. 1652–1655, Nov. 22, 1958.

Lazarus et al.: "Oral Prolonged Action Medicaments: Their Pharmaceutical Control and Therapeutic Aspects," J. Pharm. and Pharmacol., vol. 11, No. 5, pp. 257–290 (pertinent to In Vivo Tablet Availability of Drugs are especially pp. 266–271, 277–279, and 285–288), May 1959.

Campbell et al.: "Oral Prolonged Action Medication," Practitioner, vol. 183, pp. 758–765, December 1959.

"Kanulase," trademark #705,161, registered Oct. 4, 1960 (date of first use in Commerce, Feb. 25, 1960).

Report, Commission on Enzymes of the International Union of Biochemistry (August 1961), published by Pergamon Press, New York, N.Y. Library of Congress Card Cat. No. 61-15805.

Lazarus et al.: "Absorption, Testing, and Clinical Evaluation of Oral Prolonged-Action Drugs, Review Article," Journal of Pharmaceutical Sciences, vol. 50, No. 9, pp. 715–732, September 1961.

Whistler et al.: "Industrial Gums, Polysaccharides, and Their Derivatives," Academic Press, N.Y., 1959; pp. 1–13, 369, 377, 382, 390–394, 412, 693–697.

LEWIS GOTTS, *Primary Examiner.*

M. O. WOLK, I. MARCUS, F. CACCIAPAGLIA, JR.,
*Examiners.*